United States Patent

[11] 3,583,787

[72] Inventors Michel A. Duguay
 Berkeley Heights;
 Peter M. Rentzepis, Millington, both of, N.J.
[21] Appl. No. 692,583
[22] Filed Dec. 21, 1967
[45] Patented June 8, 1971
[73] Assignee Bell Telephone Laboratories, Incorporated
 Murray Hill, Berkeley Heights, N.J.

[54] OPTICAL SIGNAL DETECTOR
 5 Claims, 9 Drawing Figs.
[52] U.S. Cl. .................................................. 350/160,
 331/94.5, 332/7.51
[51] Int. Cl. .................................................. G02f 1/28
[50] Field of Search ................................. 350/160 P;
 331/94.5; 332/7.51

[56] References Cited
 UNITED STATES PATENTS
3,453,429 7/1969 Duguay et al. ............... 331/94.5X OTHER REFERENCES
"Investigation of Spectral Bleaching in Passive Q-Switch Dyes" by C. R. Giuliano et al. Applied Physics LTRS Vol. 9, No. 5, 1 Sept. 1966

Primary Examiner—Ronald L. Wibert
Assistant Examiner—T. Major
Attorneys—R. J. Guenther and Arthur J. Torsiglieri ABSTRACT: A signal detector and/or display system includes a bleachable dye medium whose transparency to optical signals is nonlinearly related to the intensities of coincident signals transmitted through the medium. A pulse of picosecond width is detected and the pulse width measured by causing the pulse to overlap itself within the medium. A complex signal is displayed by sampling the signal with a picosecond pulse within the medium.

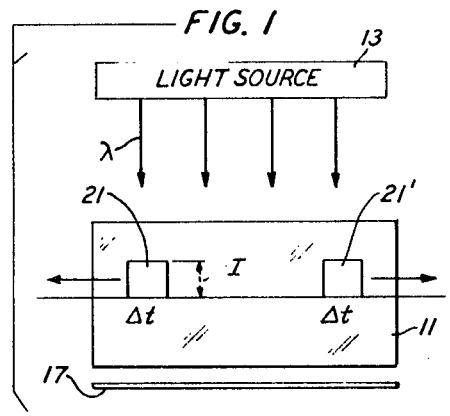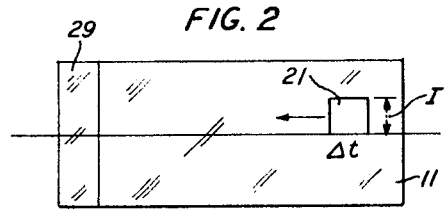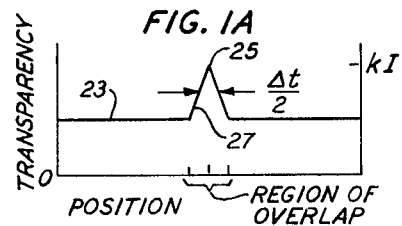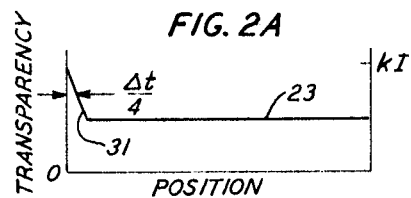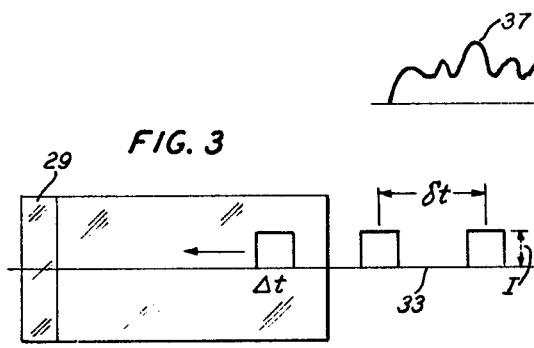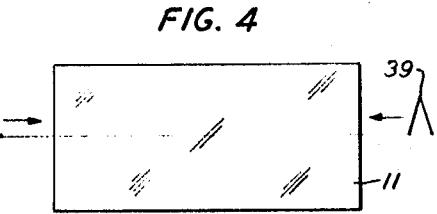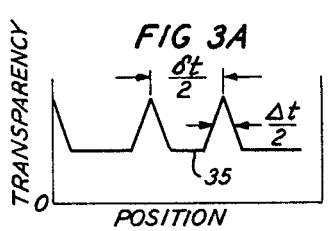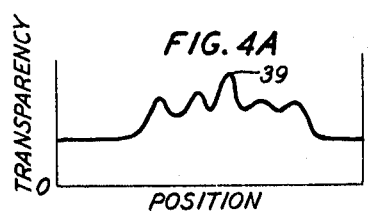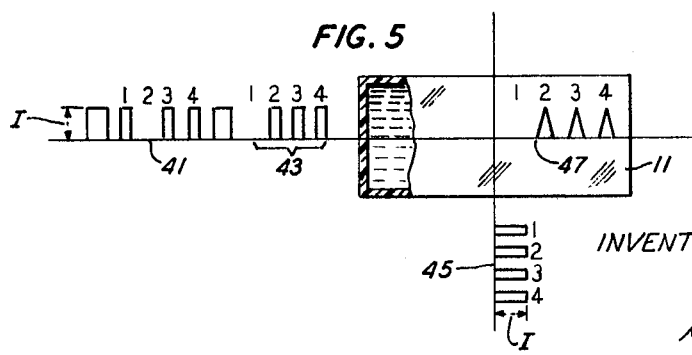

OPTICAL SIGNAL DETECTOR

BACKGROUND OF THE INVENTION

This invention relates to optical signal detectors and more particularly to picosecond pulse detectors and display devices utilizing bleachable dyes.

Recent developments in the laser art have made it possible to phase lock the oscillating modes of a laser by any of several well-known techniques including synchronous modulation and Q-switching. The output of a phase-locked laser is a pulse train having a pulse repetition rate given by $c/2L$, where $c$ is the velocity of light and L is length of the active medium. More importantly, however, the pulse width of the pulses generated is typically in the picosecond range. Such pulses, which are also produced by stimulated Roman emission, are ideally suited to serve as the carrier for an optical pulse code modulation system.

To utilize such narrow pulses in an optical communication system, it is necessary to be able to detect the pulses at a receiver. The enormous bandwidth required to detect such narrow pulses, however, is not available in prior-art receivers.

In addition, in many cases it is desirable to measure the pulse width and pulse repetition rate of such a pulse train. The prior art has resorted to certain indirect methods of measurement including coincidence techniques which utilize electro-optic crystals that generate as an output the sum and difference frequencies of two coincident signal inputs. To detect a pulse from a phase-locked laser, for example, the pulse is split into two signals and passed simultaneously through the crystal. The output of the crystal is detected. By inserting a variable time delay into the path of one of the signals, the output can be reduced to zero. The amount of delay inserted is then an indirect measure of the pulse width. However, the measurements cannot be accurately made from a single pulse, rather many pulses are required to adjust properly the delay and to reduce the output to zero.

SUMMARY OF THE INVENTION

In accordance with an illustrative embodiment of the invention a pulse detector comprises a bleachable dye medium, typically phthalocyanine or cryptocyanine, whose transparency to optical signals is nonlinearly related to the intensities of coincident signals transmitted through the medium. That is, when only a single pulse is directed into the medium the transparency produced is proportional to that intensity. But, when a second pulse (of the same intensity and duration) is transmitted through the medium, the transparency produced in the areas where the pulses are coincident and overlap is not simply the linear addition of the transparency produced by each pulse, rather it is a nonlinear mathematical function of the intensities of each signal. For example, suppose each of two signals produces a transparency of two units. Where the signals overlap, but are not coincident, the transparency is determined by linear addition, i.e., $2+2=4$ units. On the other hand where the signals overlap and are coincident, the transparency would be greater depending on the precise mathematical relationship between intensity and transparency. If for instance the nonlinearity obeyed a sum of the squares relationship, the transparency in the latter case would be $(2+2)^2=16$ units. The contrast ratio would therefore be 4:1. In addition, the length of transparent area is proportional to the duration of the pulse. The intensity pattern can be photographed by directing an exposure signal through the medium simultaneously with the coincidence of the overlapping pulses. The portion of the exposure signal transmitted through the medium exposes a photographic plate and thereon reproduces the intensity pattern.

The invention operates as a pulse decoder in an optical pulse code modulation system as follows. The modulated carrier, typically a train of picosecond information pulses generated by a phase-locked laser, is directed into the medium. A picosecond interrogate pulse is also directed into the medium at appropriate times in order to be coincident with and to overlap a particular information pulse. When an information pulse is present, the transparency of the medium is nonlinearly related to the intensities of the information and interrogate pulses, as described above. When, however, no information pulse is present, the transparency is considerably less. The contrast is readily detected in order to indicate the presence or absence of an information pulse (i.e., logical 1 or 0).

A display device, which could be termed an optical oscilloscope is readily adaptable to the use of bleachable dyes. A complex signal is displayed by directing it through the medium in one direction and directing simultaneously a picosecond sampling pulse through the medium in the opposite direction. The instantaneous transparency of the medium is proportional to the instantaneous amplitude of the complex signal with picosecond resolution, and the length of the transparent area is proportional to the duration of the complex signal.

In a similar way, picosecond pulses can be displayed. For instance, a pulse to be detected is split into two signals which, again, are directed simultaneously through the medium in opposite directions. Where the pulses overlap, nonlinear transparency is produced, the length of the transparent area being a direct measure of the picosecond pulse width.

BRIEF Description OF THE DRAWINGS

The above features of the invention, together with its various advantages, can be easily understood from the following more detailed discussion taken in conjunction with the accompanying drawings, in which:

FIG. 1 shows schematically one embodiment of the invention for measuring pulse width;

FIG. 1A is a graph of the transparency produced by the invention as shown in FIG. 1;

FIG. 2 shows schematically another embodiment of the invention for measuring pulse width;

FIG. 2A is a graph of transparency produced by the invention as shown in FIG. 2;

FIG. 3 shows schematically an embodiment of the invention for measuring both the pulse width and pulse repetition rate of a pulse train;

FIG. 3A is a graph of transparency produced by the invention as shown in FIG. 3;

FIG. 4 shows schematically an optical oscilloscope in accordance with one embodiment of the invention;

FIG. 4A is a graph of transparency produced by the invention as shown in FIG. 4; and FIG. 5 shows schematically a pulse decoder in accordance with one embodiment of the invention.

DETAILED DESCRIPTION

Turning now to FIG. 1 there is shown schematically a display device for measuring pulse width and intensity comprising a medium 11 whose transparency to optical signals is nonlinearly related to the intensities of the signals. The medium 11 is typically a bleachable dye such as phthalayanine, cryptocyanine or a commercially available dye such as Kodak-Eastman 9760 or 9740. An exposure signal source 13 located on one side of the medium 11 directs a long duration pulse (e.g., nanoseconds) into the medium, and a photographic plate 17 is located on the opposite side of the medium in the path of the exposure signal.

A pulse, of wavelength $\lambda$ and of unknown width $\Delta t$ and intensity I, to be displayed is split into two pulses 21 and 21' which are directed in opposite directions through the medium 11. The pulses produce transparency at wavelength $\lambda$ in the medium. The transparency pattern is recorded on the photographic plate 17 (or other suitable optical recorder) by making the wavelength of the exposure signal to be $\lambda$ also, and by making the duration of the exposure signal long enough that it is always present during the time interval when the pulses overlap. In this manner, the exposure signal is transmitted through only the regions of the medium in which transparency has been produced. The amount of the exposure signal which is transmitted, and consequently the amount of exposure produced in the photographic plate, is related to the amount of transparency produced by the pulses being detected. A graph of transparency versus position within the medium is shown in FIG. 1A. As discussed previously, where the pulses overlap and are coincident, the transparency is a maximum, as at peak 25 of image pulse 27, the maximum transparency being designated $k$ I, where $k$ is a constant. Where, however, the pulses overlap but are not coincident the transparency is a minimum (line 23). The transparency pattern in the region of overlap (image pulse 27) is a convolution of the intensities of the individual pulses 21 and 21', and the length of the image pulse 27 is proportional to the duration of the unknown pulses. Thus, the unknown parameters of a pulse can be completely determined by the aforementioned technique.

The parameters of a pulse can be determined without splitting the pulse into two signals, as shown in FIG. 2. The exposure light source and the photographic plate have been omitted for convenience. A mirror 29 is placed at one end of the medium 11 and the pulse 21 to be detected enters the other end. The pulse 21 strikes the mirror 29 normally and is reflected upon itself for a period $\Delta t/2$ in a region of the medium adjacent the mirror. The effect is the same as if two pulses overlapped within the medium. The maximum transparency occurs at the mirror. The image pulse 31, as shown in FIG. 2A, has a width measured from the mirror surface proportional to the duration of the unknown pulse.

In the same way, as shown in FIG. 3, the pulse spacing $\delta t$ and pulse width $\Delta t$ of a pulse train 33 can be measured by utilizing a mirror 29 disposed at one end of a bleachable dye medium. The image pulses 35, as depicted in the graph of FIG. 3A, are characterized by a pulse spacing of $\delta t/2$ and a pulse width of $\Delta t/2$. Thus, measurement of the characteristics of the image pulses 35 is a direct measure of the parameters of the pulse train 33. Again, the exposure light source and the photographic plate have been omitted for convenience.

In a specific example, the Kodak-Eastman dyes 9760 and 9740 detect pulses having wavelength of 10,600 A whereas phthalocyanine and cryptocyanine detect pulses having wavelength of 6943 A. Other dyes, of course, can be employed to detect other wavelengths without departing from the spirit and scope of the present invention.

In another embodiment of the invention, as shown in FIG. 4, a medium 11 is utilized as part of an optical oscilloscope. The exposure light source and the photographic plate have once more been omitted for convenience. A complex signal 37 to be displayed is directed into the medium 11 and a picosecond sampling pulse 39 is directed into the medium from the opposite direction. Where the complex signal and the pulse are coincident and overlap, the transparency of medium 11 increases nonlinearly. The transparency pattern is photographed and the graph shown in FIG. 4A is plotted by a densitometer. The curve 39 is a reproduction of the complex signal 37. The optical oscilloscope is particularly useful where the complex signal has duration of only 100 to 1000 picoseconds or less and is therefore not reproducible by prior-art techniques. The resolution provided in the present embodiment is typically a picosecond, the width of the sampling pulse. For proper reproduction the intensities of the complex signal and the sampling pulse are preferably made to be equal.

The present invention serves as an optical decoder for a pulse code modulation system as shown in FIG. 5. The exposure light source has again been omitted. A train of information pulses 41 to be decoded is directed into the medium 11. In particular, consider the frame, designated by the bracket 43, which consists of four channels each having an information pulse present except the first. A group of four sampling pulses 45 is also directed into the medium 11 along a path to intercept the information pulses. The sampling pulses are timed so that each sampling pulse overlaps and is coincident with a corresponding information pulse. The coincidence of an information pulse and a sampling pulse produces nonlinear transparency as previously defined, whereas the absence of an information pulse results in a much lower transparency produced by the sampling pulse alone. Thus, the presence or absence of an information pulse (i.e., logical 1 or 0) is indicated by the transparency recorded, as shown at 47 for example.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What we claim is:

1. Optical apparatus comprising a medium whose transparency to coincident optical signals in nonlinearly related to the intensities of the individual signals directed into said medium, means for introducing a first signal at wavelength $\lambda$ into said medium, means for producing within a region of said medium an optical representation of the first signal comprising means for causing a second signal also at wavelength $\lambda$ to intercept the first signal within said region of said medium, thereby to produce nonlinear transparency in said medium in the region of overlap, means for directing a relatively long duration exposure signal at wavelength $\lambda$ through said region of overlap, said first and second signals being coincident within said region during the duration of said exposure signal, and optical recording means disposed so as to intercept the exposure signal after it passes through said medium.

2. The optical apparatus of claim 1 for use as an optical oscilloscope wherein the first signal is a complex signal and the second signal is a sampling pulse of at most picosecond duration.

3. The optical apparatus of claim 1 wherein the first signal is directed into one end of said medium and said means for causing a second signal to intercept the first signal comprises means for causing said first signal to overlap itself within said medium comprising a reflector disposed at the other end of said medium normal to the path of the first signal.

4. The optical apparatus of claim 1 wherein said medium comprises phthalocyanine.

5. The optical apparatus of claim 1 wherein said medium comprises cryptocyanine.